(12) United States Patent
Ramarge et al.

(10) Patent No.: US 9,438,024 B2
(45) Date of Patent: Sep. 6, 2016

(54) ISOLATOR PROTECTION DEVICE

(71) Applicants: Michael M. Ramarge, Olean, NY (US); Timothy Stephen Smith, Fuquay Varina, NC (US)

(72) Inventors: Michael M. Ramarge, Olean, NY (US); Timothy Stephen Smith, Fuquay Varina, NC (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 14/868,764

(22) Filed: Sep. 29, 2015

(65) Prior Publication Data
US 2016/0094021 A1 Mar. 31, 2016

Related U.S. Application Data

(60) Provisional application No. 62/057,559, filed on Sep. 30, 2014.

(51) Int. Cl.
*H02G 13/00* (2006.01)
(52) U.S. Cl.
CPC .................................. *H02G 13/00* (2013.01)
(58) Field of Classification Search
USPC ....................................................... 174/137 R
See application file for complete search history.

(56) References Cited

U.S. PATENT DOCUMENTS

| 3,662,083 | A | * | 5/1972 | Constant | H02G 13/00 174/4 C |
| 5,998,731 | A | * | 12/1999 | Takamura | H02G 13/00 174/3 |
| 7,236,341 | B1 | * | 6/2007 | Carpenter, Jr. | H02G 13/00 361/117 |
| 2004/0239471 | A1 | | 12/2004 | Lenk et al. | |
| 2011/0216463 | A1 | | 9/2011 | Kester et al. | |

FOREIGN PATENT DOCUMENTS

EP 0548333 A1 6/1993

OTHER PUBLICATIONS

The International Search Report and Written Opinion from Corresponding International Application PCT/US2015/052845, mailed Jan. 21, 2016 (6 pages).

* cited by examiner

*Primary Examiner* — Dhirubhai R Patel
(74) *Attorney, Agent, or Firm* — King & Spalding LLP

(57) ABSTRACT

An isolator protection device can include a housing having at least one wall and a first coupling feature, where the at least one all forms a cavity, where the first coupling feature is configured to couple to an arrester, and where the at least one wall is configured to house an isolator body of an isolator within the cavity. The isolator protection device can also include a securing device disposed within the cavity, where the securing device is configured to secure a stud of the isolator to the isolator body during normal operating conditions.

20 Claims, 7 Drawing Sheets

ISOLATOR PROTECTION DEVICE

CROSS REFERENCE TO RELATED APPLICATIONS

This application claims priority under 35 U.S.C. §119 to U.S. Provisional Patent Application Ser. No. 62/057,559, titled "Isolator Protection Device" and filed on Sep. 30, 2014, the entire contents of which are hereby incorporated herein by reference.

TECHNICAL FIELD

Embodiments described herein relate generally to electric power transmission equipment, and more particularly to systems, methods, and devices for protecting insulators at the end at transmission line arresters.

BACKGROUND

An arrester sometimes called a lightning arrester or a surge arrester or a transmission line arrester) is a device used on electrical power systems and telecommunications systems to protect the insulation and conductors of the system from the damaging effects of lightning and other fault currents. A typical arrester has a high-voltage terminal and a secondary terminal. When a power surge (fault current) travels along the power line to the arrester, the current from the surge is diverted through the arrester, in most cases to earth (also called ground, an electrical ground, or an earth ground). If protection from the arrester fails or is absent, a power surge on the electrical system can introduce thousands of kilovolts that may damage transmission lines and/or cause severe damage to transformers and other electrical or electronic devices.

SUMMARY

In general, in one aspect, the disclosure relates to an isolator protection device. The isolator protection device can include a housing having at least one wall and a first coupling feature, where the at least one wall forms a cavity, where the first coupling feature is configured to couple to an arrester, and where the at least one wall is configured to house an isolator body of an isolator within the cavity. The isolator protection device can also include a securing device disposed within the cavity, where the securing device is configured to secure a stud of the isolator to the isolator body during normal operating conditions.

In another aspect, the disclosure can generally relate to an electrical transmission system that includes an arrester. The arrester of the electrical transmission system can include an isolator having an isolator body and a stud coupled to a distal end of the isolator body. The arrester of the electrical transmission system can include an isolator protection device coupled to the arrester. The isolator protection device can include a housing having at least one wall and a first coupling feature, where the at least one wall forms a cavity, where the first coupling feature couples to the arrester, and where the isolator body and at least a portion of the stud is disposed within the cavity. The isolator protection device can also include a securing device disposed within the cavity, where the securing device couples to the stud of the isolator and helps maintain a coupling between the stud and the isolator body during normal operating conditions.

These and other aspects, objects, features, and embodiments will be apparent from the following description and the appended claims.

BRIEF DESCRIPTION OF THE DRAWINGS

The drawings illustrate only example embodiments of isolator protection devices and are therefore not to be considered limiting of its scope, as isolator protection devices may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
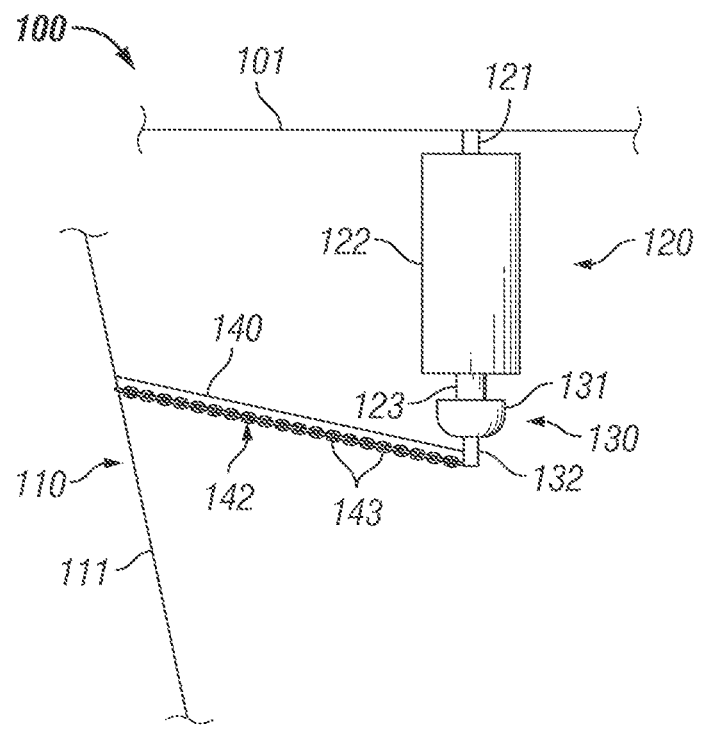
FIG. 1 shows a portion of a transmission system that includes a transmission line arrester in a normally-operating state according to embodiments currently known in the art.

The example embodiments discussed herein are directed to systems, apparatuses, and methods of isolator protection devices. While example embodiments are described herein as being directed to transmission line arresters, example embodiments can also be used in other systems using arresters, including but not limited to electric distribution systems. As described herein, a user can be any person that interacts with example isolator protection devices. Examples of a user may include, but are not limited to, a consumer, an electrician, an engineer, a lineman, a consultant, a contractor, an operator, and a manufacturer's representative.

In one or more example embodiments, an arrester or similar electrical protection device is subject to meeting certain standards and/or requirements. For example, the International Electrotechnical Commission (EEC) sets standards, such as IEC 60099-4 Ed 2.2 (2009) that applies to metal-oxide surge arresters without gaps for alternating current (AC) systems with which an arrester must comply to be used in field applications. Example embodiments are designed to be used with an arrester or similar electrical protection device so that such arrester or similar electrical protection device is in compliance with any applicable standards and/or regulations.

The example isolator protection devices (or components thereof) described herein can be physically placed in outdoor environments, in addition, or in the alternative, example isolator protection devices (or components thereof) can be subject to extreme heat, extreme cold, moisture humidity, chemical exposure (related to potential combustion for chemical corrosion), high winds, dust, and other conditions that can cause wear on the isolator protection devices or portions thereof. In certain example embodiments, the isolator protection devices, including any components and/or portions thereof are made of materials that are designed to maintain a long-term useful life and to perform when required without mechanical failure. Such materials can include, but are not limited to, aluminum, stainless steel, plastic, and ceramic.

Any example isolator protection device, or portions (e.g., features) thereof, described herein can be made from a single piece (as from a mold). When an example isolator protection device or portion thereof is made from a single piece, the single piece can be cut out, bent, stamped, and/or otherwise shaped to create certain features, elements, or other portions of a component. Alternatively, an example isolator protection device (or portions thereof) can be made from multiple pieces that are mechanically coupled to each other. In such is case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements ace/or features within a component or device and are not meant to limit the capability or function of that particular element and/or feature. For example, a feature described as a "coupling feature" can couple, secure, fasten, and/or perform other functions aside from merely coupling.

A coupling feature (including a complementary coupling feature) as described herein can allow one or more components and/or portions of an isolator protection device (e.g., a housing) to become mechanically and/or electrically coupled, directly or indirectly, to another portion (e.g., securing device) of the isolator protection device and/or to an arrester (or component thereof). A coupling feature can include, but is not limited to, portion of a hinge, an aperture, a recessed area, a protrusion, a slot, a spring clip, a tab, a detent, and mating, threads. One portion of an example isolator protection device can be coupled to another portion of an isolator protection device and/or to an arrester by the direct use of one or more coupling features.

In addition, or in the alternative, a portion of an example isolator protection device can be coupled to another portion of the isolator protection device and/or an arrester using one or more independent devices that interact with one or more coupling features disposed on a component of the isolator protection device. Examples of such devices can include, but are not limited to, a pin, a hinge, a fastening device a stud, a bolt, a screw, a rivet), and a spring. One coupling feature described herein can be the same as, or different than, one or more other coupling, features described herein. A complementary coupling feature as described herein can be a coupling feature that mechanically couples, directly or indirectly, with another coupling feature.

Any component described in one or more figures herein can apply to any subsequent figures having the same label. In other words, the description for an component of a subsequent (or other) figure can be considered substantially the same as the corresponding component described with respect to a previous (or other) figure. The numbering scheme for the components in the figures herein parallel the numbering scheme for the components of previously described figures in that each component is a three or four digit number having either the identical last two digits. For any figure shown and described herein, one or more of the components may be omitted, added, repeated, and/or substituted. Accordingly, embodiments shown in a particular figure should not be considered limited to the specific arrangements of components shown in such figure.

Example embodiments of isolator protection devices will be described more fully hereinafter with reference to the accompanying drawings, in which example isolator protection devices are shown. Isolator protection devices may, however, be embodied in many different forms and should not be construed as limited to the example embodiments set forth herein. Rather, these example embodiments are provided so that this disclosure will be thorough and complete, and will fully convey the scope of isolator protection devices to those of ordinary skill in the art. Like, but not necessarily the same, elements (also sometimes called components) in the various figures are denoted by like reference numerals for consistency.

Terms such as "first," "second," "top," "bottom" "outer," "inner," "distal," and "proximal" are used merely to distinguish one component (or part of a component or state of a component) from another. Such terms are not meant to denote a preference or a particular orientation. Also, the names given to various components described herein are descriptive of one embodiments and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

FIG. 1 shows a portion of a transmission system 100 that includes a transmission line arrester 120 in a normally-operating state according to embodiments currently known in the art. The portion of the transmission system 100 of FIG. 1 can include a ground source 110, at least one first phase high-voltage conductor 101, an arrester 120, a ground conductor 140, and a tether 142.

The ground source 110 can be any device that is electrically coupled to an earth ground. An example of a ground source 110, as shown in FIG. 1, can be a transmission tower having multiple pieces 111 made of metal or some other electrically conductive material. Other examples of a ground source 110 can include, but are not limited to, a ground conductor (separate from the ground conductor 140), an electrically conductive pole, and a ground grid.

The first phase high-voltage conductor 101 can be one or more conductors that carry a common phase of power. For example, the first phase high-voltage conductor 101 can carry one phase of AC power. As another example, the first phase high-voltage conductor 101 can carry one leg (e.g., positive leg, negative leg) of direct current (DC) power. The power flowing through the first phase high-voltage conductor 101 cart have a voltage level that is sufficient to use an arrester (e.g., arrester 120) in the manner shown in FIG. 1. Typically, but not always, the voltage carried by the first phase high-voltage conductor 101 is associated with the transmission (as opposed to distribution) of electric power.

Examples of such voltage can include, but are not limited to 230 kVAC, 345 kVAC, and 600 kVDC.

The arrester 120 can have a top end 121, an arrester body 122, and a arrester coupling device 123. The arrester 120 (including one or more of its components) can be made of an electrically non-conductive material. For example, the arrester body 122 can be made of ceramic. The top end 121 of the arrester 120 is electrically and mechanically coupled to the first phase high-voltage conductor 101. The arrester 120 can have a length and/or thickness that meets or exceeds a minimum distance required far separating (thus preventing arc-over between) the high-voltage conductor to which the arrester 120 is coupled (e.g., the first phase high-voltage conductor 101) and the ground conductor 140. The length of the arrester 120 must be considered in light of a number of factors, including but not limited to the voltage flowing through the first phase high voltage conductor 101, the distance between the first phase high-voltage conductor 101 and an adjacent high-voltage conductor, the length of the ground conductor 140, and the distance between the arrester coupling device 123 of the arrester 120 and an adjacent high-voltage conductor.

The arrester body 122 can include one or more features (e.g., protrusions) disposed on its outer surface to help ensure that the arrester 120 operates properly both during normal operating conditions and during limit conditions. Under normal operating conditions, as shown in FIG. 1, the arrester 120 acts as an insulator. In other words, under normal operating conditions, the arrester 120 prevents current from flowing from the top end 121 of the arrester 120 to the arrester coupling device 123 of the arrester 120. Thus, the arrester 120 creates an open circuit between the first phase high-voltage conductor 101 and the ground conductor 140 during normal operating conditions.

In certain example embodiments, the arrester 120 can include one or more components. For example, the arrester 120 can include an isolator 130. In this case, the isolator 130 is disposed at the arrester coupling device 123 of the arrester 120. The isolator 130 can include one or more components. For example, as shown in FIG. 1, the isolator 130 can include an isolator body 131 and a stud 132. Generally speaking, the isolator 130 acts as a type of mechanical switch. Specifically, the isolator 130 acts as a type of release mechanism that physically releases (directly or indirectly) the stud 132 disposed at the distal end of the isolator body 131 from the isolator body 131 when a certain condition is met (in this case, when a fault current is detected flowing through the arrester 120). The isolator 130 can be configured in one or more of a variety of forms. For example, the isolator 130 can be a relay with a coil (positioned within the isolator body 131) that energizes. In response to the energized coil, the isolator 130 can change the state of a contact (e.g., from open (normal state) to closed (operated state)).

As another example, the isolator 130 can be a disconnection in such a case, the isolator 130 can include a detonator positioned within the isolator body 131 that detonates based on a range of currents for a given frequency. One or more discrete components (e.g., capacitors, inductors, resistors) and/or integrated circuits can be part of or electrically coupled to, the isolator 130 to control the conditions under which the detonator of the disconnector (or any other aspect of isolator 130) detonates. If the isolator 130 is a disconnector, the isolator 130 can have an unprimed cartridge located in the vicinity of a sparkgap, which is oriented in parallel with some type of electrical grading component (e.g., an electronic capacitor, an electronic resistor, a conductive polymer, a high-wattage resistor). In such a case, during a fault condition, a voltage drop that occurs across the grading, component can cause a heat buildup, thus igniting the cartridge. In certain example embodiments, the isolator 130 can break into multiple pieces when the disconnector or other part of the isolator 130) detonates. The isolator 130 can be subject to one or more of a number of standards and/or regulations. Examples of such standards and/or regulations can include, but are not limited to, the Institute of Electrical and Electronics Engineers (IEEE) Standard C62.11-2012 and IEC 60099-4 (2009, ed. 2.2).

The ground conductor 140 is electrically and mechanically coupled to the isolator 130 (in this case, to the stud 132 of the isolator 130) at one end and to a piece 111 of the ground source 110 at the other end. The ground conductor 140 is made of one or more of a number of electrically conductive materials (e.g., copper, aluminum) and can be of an appropriate size (e.g., 6 AWG) to allow a fault current to flow therethrough during a limit condition. Specifically, a fault current flows from the stud 132, through the ground conductor 140, and to the ground source 110.

Similarly, the optional tether 142 can be mechanically coupled to the isolator 130 (in this case, to the stud 132 of the isolator 130) at one end and to a piece 111 of the ground source 110 at the other end. In addition, the tether 142 can be mechanically coupled to the ground conductor 140 at one or more points along the length of the ground conductor 140. The tether 142 can be made of one or more of a number of electrically conductive materials (e.g., copper, aluminum). The tether 142 can be constructed in such a way as to be flexible. For example, as shown in FIG. 1, the tether 142 can be a chain having a number of links 143 that are coupled end-to-end in a line.

The tether 142 can be used for one or more of a number of purposes. For example, the tether 142 can help anchor the arrester 120, a relatively heavy component, against wind, vibrations, and other forces that can be applied to the arrester 120. Without the tether 142, only the ground conductor 140 would be used to anchor the arrester coupling device 123 of the arrester 120.

Figure 2:
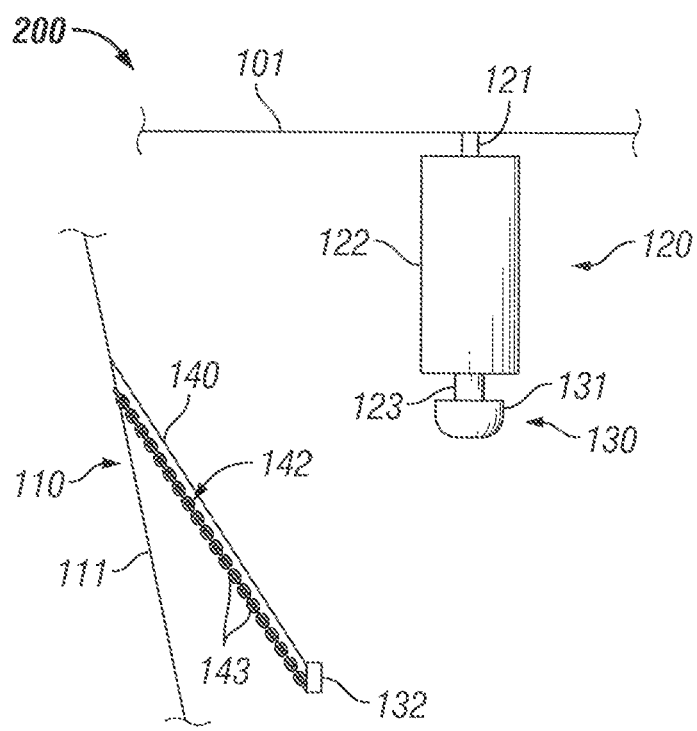
FIG. 2 shows the portion of the transmission system of FIG. 1 that includes the transmission line arrester in a fault state according to embodiments currently known in the art.

FIG. 2 shows the portion of the transmission system 200 of FIG. 1 that includes the transmission line arrester 120 in a fault state according to embodiments currently known in the art. The components of FIG. 2 are identical to the components of FIG. 1, except that FIG. 2 shows a fault condition as opposed to the normal operating conditions shown in FIG. 1. When a fault condition occurs, a fault current is generated. In such a case, the arrester 120 conducts and allows the fault current to flow therethrough. Alternatively, FIG. 2 can show the portion of the transmission system 200 of FIG. 1 when the stud 132 experiences excessive mechanical stress, which causes the stud 132 (along with the ground conductor 140 and the tether 142) to separate from the rest of the arrester 120. Separation of the stud 132 from the remainder of the arrester 120 (and specifically from the isolator body 131 of the isolator 130) due to mechanical stress can occur during normal operating conditions or during a fault condition.

As described herein, a fault current also called, among other commonly known names, a power surge or simply a fault), is an electrical disturbance associated with a fault condition that falls outside of normal operating conditions and can lead to damage of electrical equipment if not contained and controlled. A fault current can be caused by one or more of a number of conditions, including but not limited to a lightning strike, a mechanical breakage, excessive heat, an open circuit, and putting power too close to ground.

When the isolator 130 detects a fault current flowing through the arrester 120, the isolator 130 changes from the normal state to an operated state. For the brief fractions of a second before the isolator 130 changes to the operated state, the fault current flowing through the arrester 120 continues through the stud 132 of the isolator 130, through the ground conductor 140, and to the piece 111 of the ground source 110. Once the isolator 130 is in the operated state, as shown in FIG. 2, the stud 132 of the isolator 130 physically separates from some or all of the isolator body 131. In some cases, the isolator body 131 can break apart, in which case the stud 132 remains coupled to a portion of the isolator body 131. In any case, the stud 132 separates from the isolator body 131. When this occurs, the isolator body 131 remains coupled to the arrester coupling device 123 of the arrester 120, while the stud 132 remains mechanically and electrically coupled to the ground conductor 140 and the tether 142.

If there is no fault condition, but the stud 132 separates from the rest of the arrester 120 (as from for example, high winds and/or excessive vibrations), an outage condition can occur. In other words, by coupling the tether 142 and the ground conductor 140 to the stud 132, the stud 132 creates a failure point because of the mechanical stresses that the stud 132 can be subjected to during normal operations. If the stud 132 separates from the rest of the arrester 120 and it the tether 142 and the ground conductor 140 are mechanically coupled to the stud 132, as in the current art, unnecessary outages can result. Further, if the arrester 120 is not electrically coupled to ground (as when the stud 132, the tether 142, and the ground conductor 140 are separated from the rest of the arrester 120), then severe damage can result when a fruit condition occurs because the arrester 120 cannot properly switch during the fault condition as designed.

Example embodiments are designed to increase the cantilever strength of the isolator 130 (and, in particular, the isolator body 131 and the stud 132) without compromising the electrical operation of the isolator and the rest of the transmission system 100. As a result, the occurrence of the type of failure described in the previous paragraph can be greatly reduced. Specifically, as described below, the housing of the example isolator protection device is designed to house the isolator body 131 and at least a portion of the stud 132 and provide strength and rigidity to the isolator 130 in the face of any forces applied substantially perpendicular to the length-wise axial direction of the isolator body 131 and the stud 132.

Figure 3A:
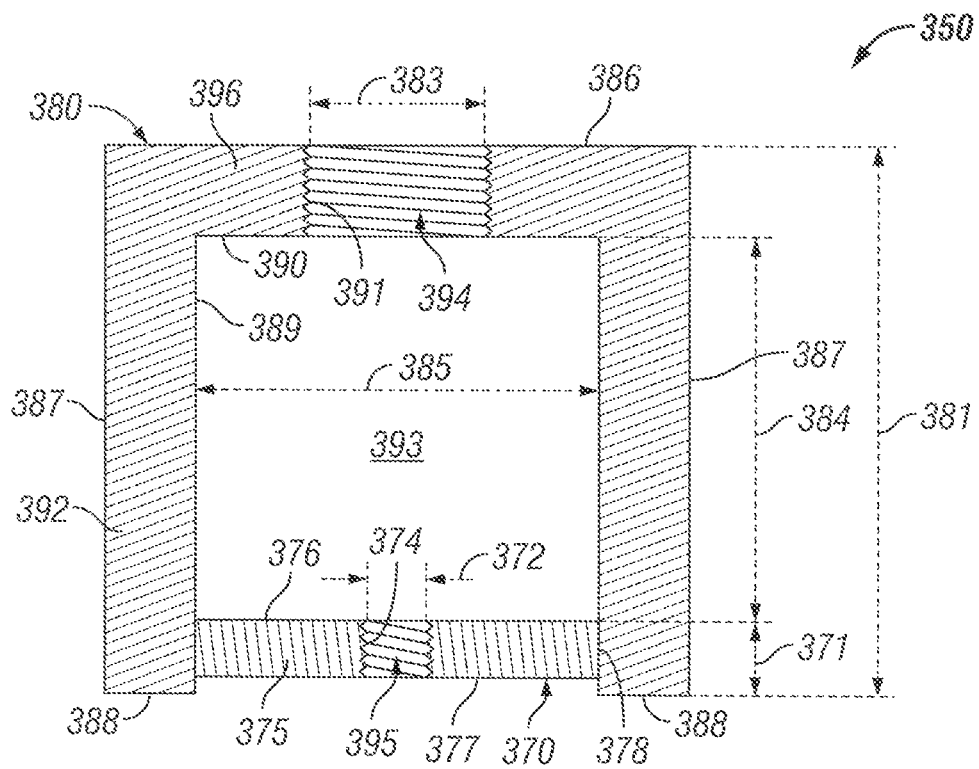
FIGS. 3A-3C show various views of an isolator protection device in accordance with certain example embodiments.
Figure 3B:
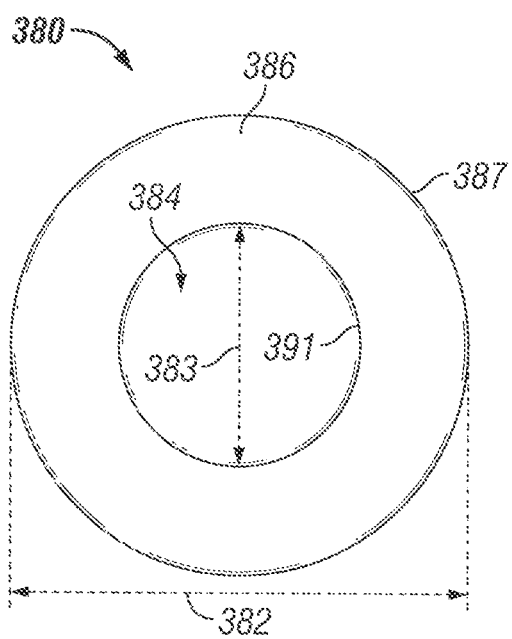
Figure 3C:
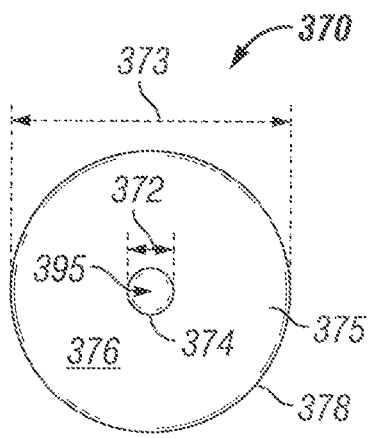

FIGS. 3A-3C show various views of an isolator protection device 350 in accordance with certain example embodiments. Specifically, FIG. 3A shows a cross-sectional side view of the isolator protection device 350. FIG. 3B shows a top view of the housing 380 of the isolator protection device 350. FIG. 3C shows a top view of the securing device 370 of the isolator protection device 350.

Referring to FIGS. 1-3C, the example isolator protection device 350 can include a housing 380 and a securing device 370. In certain example embodiments, the housing 380 has at least one wall 392. The at least one wall 392 can be disposed on the sides and top of the housing 380. On the sides, each wall 392 has an outer surface 387, an inner surface 389, and a bottom surface 388. On the top, the wall 396 has an outer surface 386 and an inner surface 390. The top wall 396 can have a coupling feature 394 that is used to couple the housing 380 to a portion of the arrester 120. For example, the coupling feature 394 can be coupled to the arrester coupling device 123.

Figure 5:
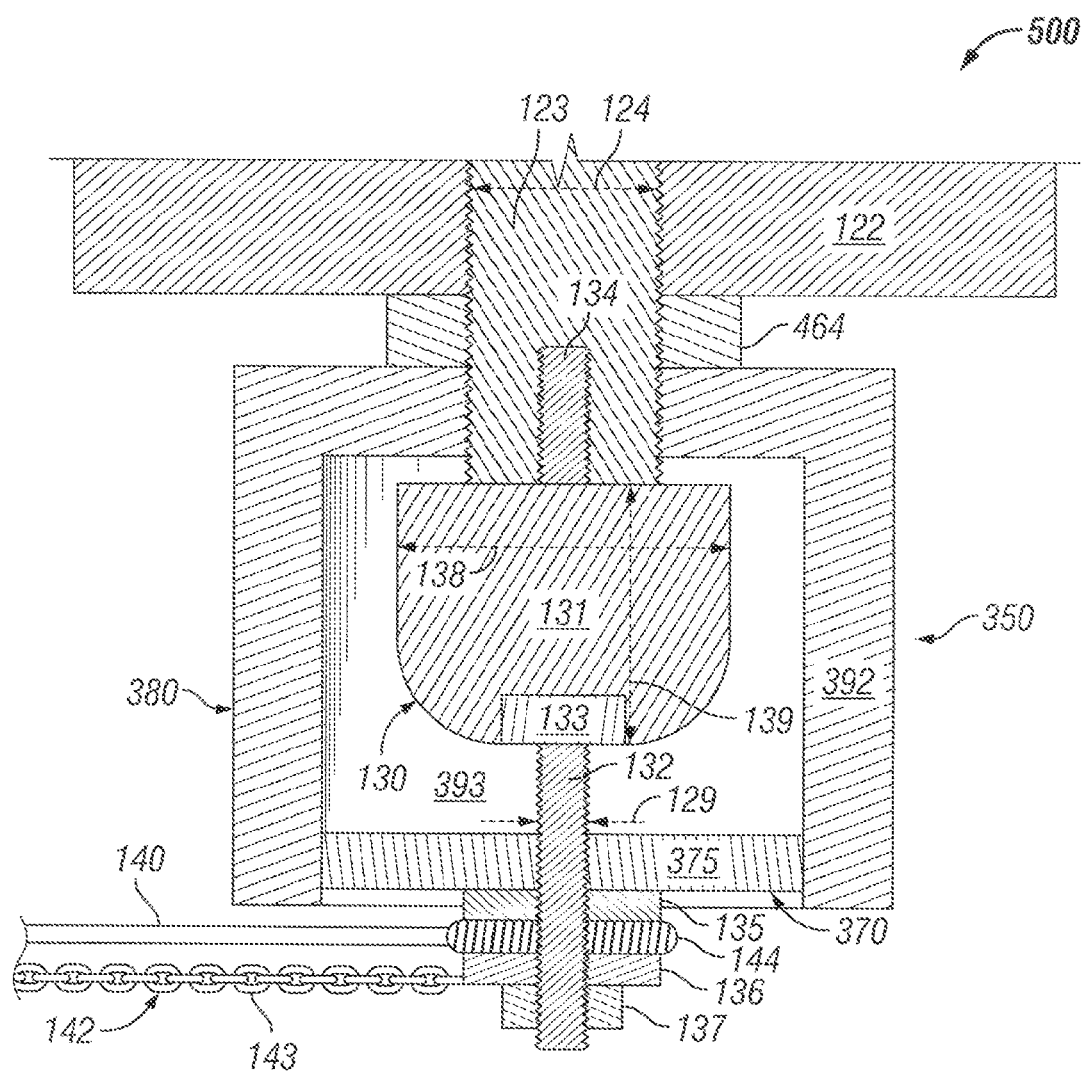
FIG. 5 shows another portion of a transmission system that includes an isolator during normal operating conditions in accordance with certain example embodiments.

The coupling feature 394 in this case is an aperture formed by an inner wall 391 that traverses the top wall 396 and has a width 383 (in this case, a diameter). An example width 383 can be approximately one inch. Mating threads are shown in FIG. 3A to be disposed on at least a portion of the inner wall 391. In such a case, as shown in FIG. 5 below, complementary mating threads can be disposed on the outer surface of the arrester coupling device 123 (or some other portion of the arrester 120). As described above, the coupling feature 394 can have any of a number of other configurations that complement the coupling features of the arrester coupling device 123.

The side wall 392, combined with the top wall 396, form a cavity 393. The bottom end (i.e., the end opposite the top wall 392) can be open. The side walls 392 of the housing 380 can form any of it number of shapes when viewed cross-sectionally from above. For example, as shown in FIG. 3B, the side walls 392 of the housing 380 can be substantially circular when viewed from above. Other shapes formed by side walls 392 of the housing 380 when viewed cross-sectionally from above can include, but are not limited to, a square, a hexagon, an oval, a rectangle, and a random shape.

The housing 380 can have a height 381 and a width 382. Similarly, the cavity 393 within the housing 380 can have a height 384 and a width 385. The width 385 of the cavity 393 can be substantially the same as, or slightly larger than, the width 373 of the securing device 370. In addition, as shown below with respect to FIG. 5, the height 384 and width 385 of the cavity can be at least as great as the height and width of the isolator body.

In certain example embodiments, the securing device 370 of the isolator protection device 350 is removably disposed within a distal end of the cavity 393 of the housing 380 and includes a coupling feature 395. In this example, the securing device 370 is a washer-shaped device that is substantially circular when viewed from above, and has a thickness 371 and a width 373 (in this case, a diameter). The cross-sectional shape of the securing device 370 when viewed from above can be substantially the same as the cross-sectional shape of the side walls 392 of the housing 380 when viewed from above. Alternatively, the cross-sectional shape of the securing device 370 when viewed from above can be shaped differently than the cross-sectional shape of the side walls 392 of the housing 380 when viewed from above, but can still be positioned within the cavity 393 in such a way that the side walls 392 prohibit or greatly reduce sideways (toward or away from a side wall 392) and/or rotational movement of the securing device 370 within the cavity 393.

In certain example embodiments, the securing device 370 of FIG. 3C is shaped as a disc and has a body 375 that has a top surface 376, a bottom surface 377, and an outer perimeter 378. The securing device 370 can also have one or more coupling features disposed thereon. For example, the securing device 370 can have coupling feature 395 used to couple the securing device 370 to a portion of the isolator 130. In this case, the coupling feature 395 is an aperture formed by an inner wall 374 that traverses the thickness 371 of the body 375 of the securing device 370. The aperture can have a width 372 (in this case, a diameter). An example width 372 can be approximately ⅜ inches. Mating threads are shown in FIG. 3A to be disposed on at least a portion of the inner wall 374. In such a case, as shown in FIG. 5 below, complementary mating threads can be disposed on the outer surface of the stud 132 (or some other portion of the isolator 130). The coupling feature 395 can have any of a number of other configurations that complement the coupling features of the stud 132. Alternatively, the inner wall 374 that forms the coupling feature 395 of the securing device 370 can be featureless (e.g., smooth).

In certain example embodiments, as shown in FIG. 5 below, the securing device 370 is held in place within the cavity 393 of the housing 380 by the stud 132 of the isolator 130. In such a case the outer perimeter 378 of the securing device 370 can be substantially featureless (e.g., smooth). As an alternative, the outer perimeter 378 of the securing device 370 can have one or more coupling features (e.g., mating threads disposed thereon to couple to complementary coupling features (e.g., complementary mating threads) of the side wall 392 (for example, along the inner surface 389 of the side wall 392) of the housing 380.

Figure 4:
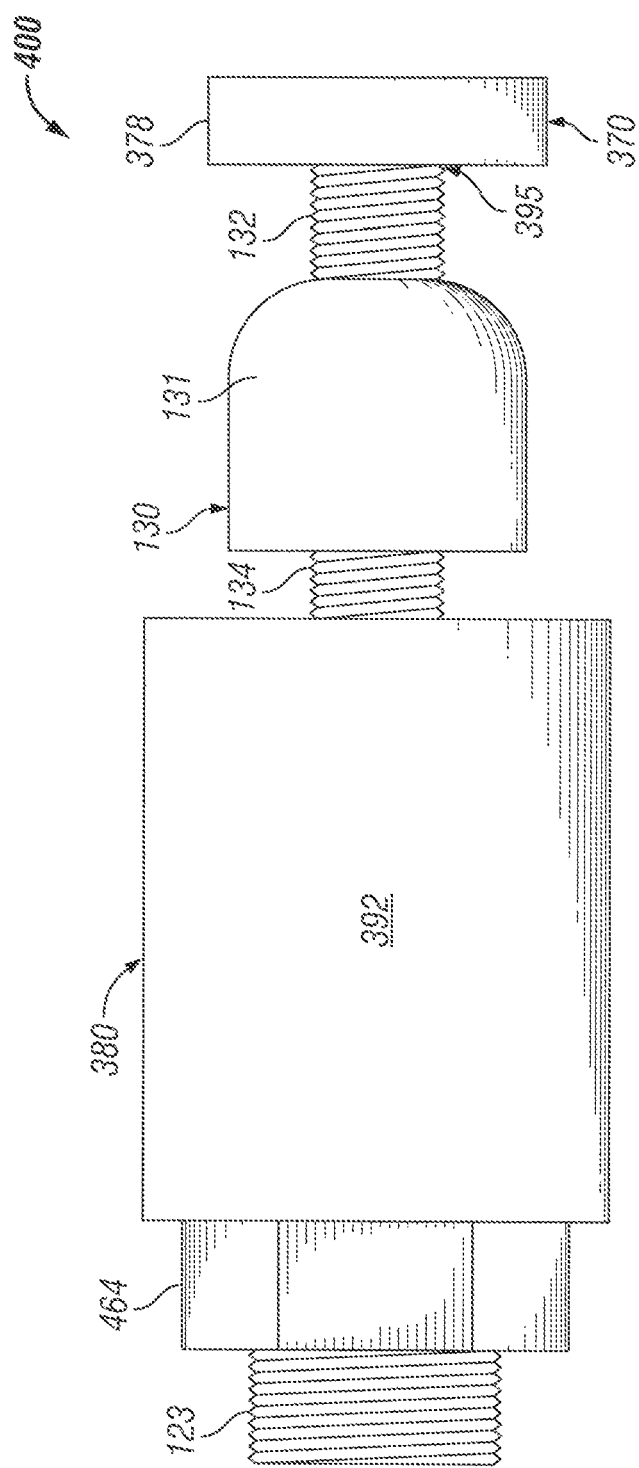
FIG. 4 shows a portion of a transmission system that includes an isolator in a normally-operating state in accordance with certain example embodiments.

FIG. 4 shows a portion of a transmission system 400 that includes the isolator protection device 350 of FIG. 3 in a normally-operating state (which is driven by the isolator 130 being in a normally-operating (non-exploded) state) in accordance with certain example embodiments. Any reference numbers described below but not shown in FIG. 4 are hereby incorporated based on the reference number used in FIGS. 1-3. Further, any description for a component with respect to FIGS. 1-3 can be incorporated into the corresponding component of the system 400 in FIG. 4.

Referring to FIGS. 1-4, the portion of the transmission system 400 shown in FIG. 4 includes the isolator protection device 350 of FIG. 3, the arrester coupling device 123 of FIGS. 1 and 2, and the isolator 130 of FIGS. 1 and 2. While more detail is provided below with respect to FIG. 5, in addition to the isolator body 131 and the stud 132 the isolator 130 includes to coupling device 134 that couples, at one end to die top of the isolator body 131 (as shown in FIG. 4) and at the opposite end to the arrester coupling device 123 (although, in FIG. 4, the coupling device 134 is decoupled from the arrester coupling device 123).

FIG. 4 also shows that the stud 132 of the isolator 130 is threadably coupled to the coupling feature 395 of the securing device 370. FIG. 4 further shows that the width 373 of the securing device 370 (defined by the outer perimeter 378) is slightly greater than the width of the isolator body 131. In addition, the arrester coupling device 123 is threadably coupled to the coupling feature 394 of the housing 380. Finally, an optional nut 464 is shown threadably coupled to the arrester coupling device 123 and positioned adjacent to the outer surface 386 of the top will 396 of the housing 380.

FIG. 5 shows another portion of a transmission system 500 that includes the isolator 130 of FIGS. 1 and 2 and the isolator protection device 350 of FIG. 3 during normal operating conditions in accordance with certain example embodiments. Any reference numbers described below but not shown in FIG. 5 are hereby incorporated based on the reference number used in FIGS. 1-4. Further, any description for a component with respect to FIGS. 1-4 can be incorporated into the corresponding component of the system 500 in FIG. 5.

Referring to FIGS. 1-5, the system 500 of FIG. 5 includes the isolator protection device 350 coupled to the arrester coupling device 123 and the stud 132 of the isolator 130, as is the case during normal operating conditions. Specifically, the outer surface of the arrester coupling device 123 in FIG. 5 is threadably coupled to the coupling feature 394 of the top wall 396 of the housing 380 of the isolator protection device 350 and to the arrester body 122. The system 500 of FIG. 5 also shows that the coupling device 134 that extends outward from the top of the isolator body 131 is threadably coupled to an inner bore disposed in the distal end of the arrester coupling device 123. The coupling device 134 can have any of a number of widths, including but not limited to be approximately ⅜ inches. In some cases, the proximal end of the coupling device 134 can have a head (not shown) that anchors the coupling device 134 into the isolator body 131. In addition, or in the alternative, the coupling device 134 can be coupled to the isolator body 131 in one or more other ways. For example, the coupling device 134 can be held within the isolator body 131 by epoxy.

As a result of the coupling device 134 of the isolator 130 being coupled to the arrester coupling device 123, the isolator body 131 is disposed entirely within the cavity 393 formed by the side walls 392 of the isolator protection device 350. In other words, the height 139 and the width 138 of the isolator body 131 is less than the height 384 and the width 385, respectively, of the cavity 393 formed by the side walls 392 and the top wall 396 of the housing 380. The optional nut 464 is also shown threadably coupled to the arrester coupling device 123 and disposed between the housing 380 and the arrester body 122. In addition to, or in the alternative of, the nut 464, one or more other optional components (e.g., a washer, a spacer) can be coupled to the arrester coupling device 123 and/or disposed between the housing 380 and the arrester body 122.

Also in FIG. 5, the securing device 370 of the isolator protection device 350 is threadably coupled to the stud 132 that extends outward from the distal end of the isolator body 131. In some cases, the proximal end of the stud 132 can have a head 133 that anchors the stud 132 into the isolator body 131. In addition, or in the alternative, the stud 132 can be coupled to the isolator body 131 in one or more other ways. For example, the stud 132 can be held within the isolator body 131 by epoxy. In addition, the securing device 370 is disposed within the cavity 393. Since the width 373 of the securing device 370 is substantially the same as or slightly less than the width 385 of the cavity 393, the stud 132 of the isolator 130 is held firmly in place within the cavity 393. In other words, any lateral forces applied by be ground conductor 140 and/or the tether 142, which are coupled to a more distal portion of the stud 132 compared to the securing device 370, have little to no effect on the mechanical integrity of the isolator 130 (and the isolator body 131 in particular) during normal operating conditions.

The tether 142 and the ground conductor 140 can be coupled to the stud 132 in a number of ways. In this case, the distal end of the ground conductor 140 of the tether 142 is coupled to a terminating device 144, and the distal end (in this case the distal link 143) of the tether 142 is coupled to a connection bar 136. In this case the resulting configuration at the distal end of the stud 132 includes a spacer 135 coupled to (or disposed over) the stud 332. In this case, the spacer 135 is disposed between the securing device 370 and the terminating device 144. In a further distal direction, the connection bar 136 is disposed between the terminating device 144 and a nut 137. Those of ordinary skill will appreciate that any of a number of other components and/or configurations can be used to securely couple the tether 142 and the ground conductor 140 to the stud 132, and provide proper clearance of the tether 142 and the ground conductor 140 from the housing 380 of the isolator protection device 350.

Figure 6:
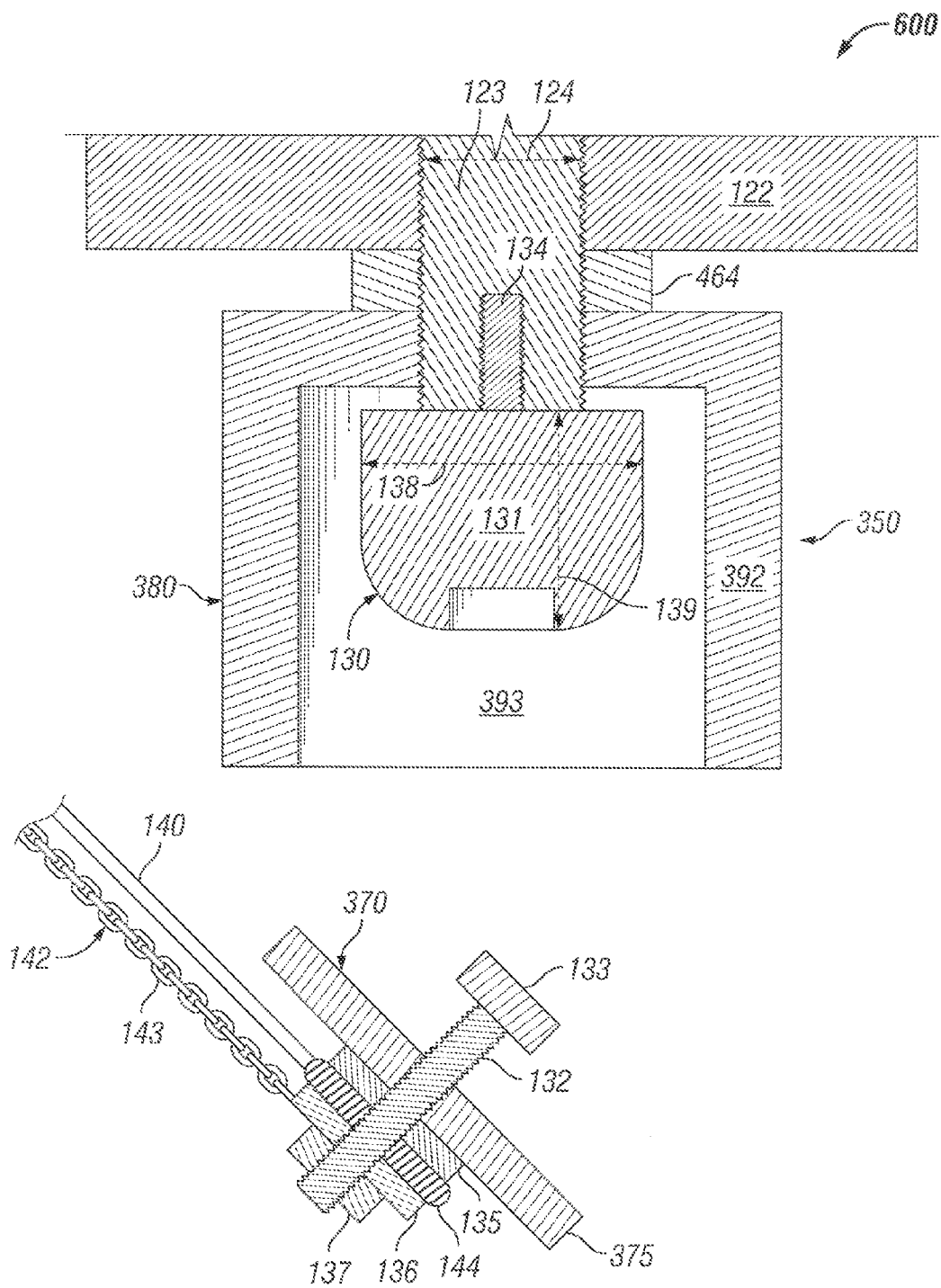
FIG. 6 shows the system of FIG. 5 shortly after a fault condition in accordance with certain example embodiments.

FIG. 6 shows a system 600 that includes the system of FIG. 5 shortly after a fault condition in accordance with certain example embodiments. In other words, the system 600 of FIG. 6 is shown in a fault state. The system 600 of FIG. 6 is substantially the same as the system 500 of FIG. 5, except as described below. Referring to FIGS. 1-6, as a result of the fault condition, the stud 132 (as well as the optional head 133) has become physically separated from the isolator body 131. Consequently, the securing device 370 is physically removed from the cavity 393 and physically separates from the rest of the isolator protection device 350. The securing device 370 is physically removed from the cavity 393 because the securing device 370 is mechanically coupled to the stud 132.

If the securing device 370 merely abuts against or does not physically contact the at least one wall 392 of the housing 380 during normal operating conditions, then the securing device 370 (and so the stud 132) can more easily be ejected from the cavity 393 when a fault condition occurs. Further, the housing 380 can be substantially undamaged as a result of the stud 132 and the securing device 370 being ejected from the cavity 393 when a fault condition occurs.

Figure 7:
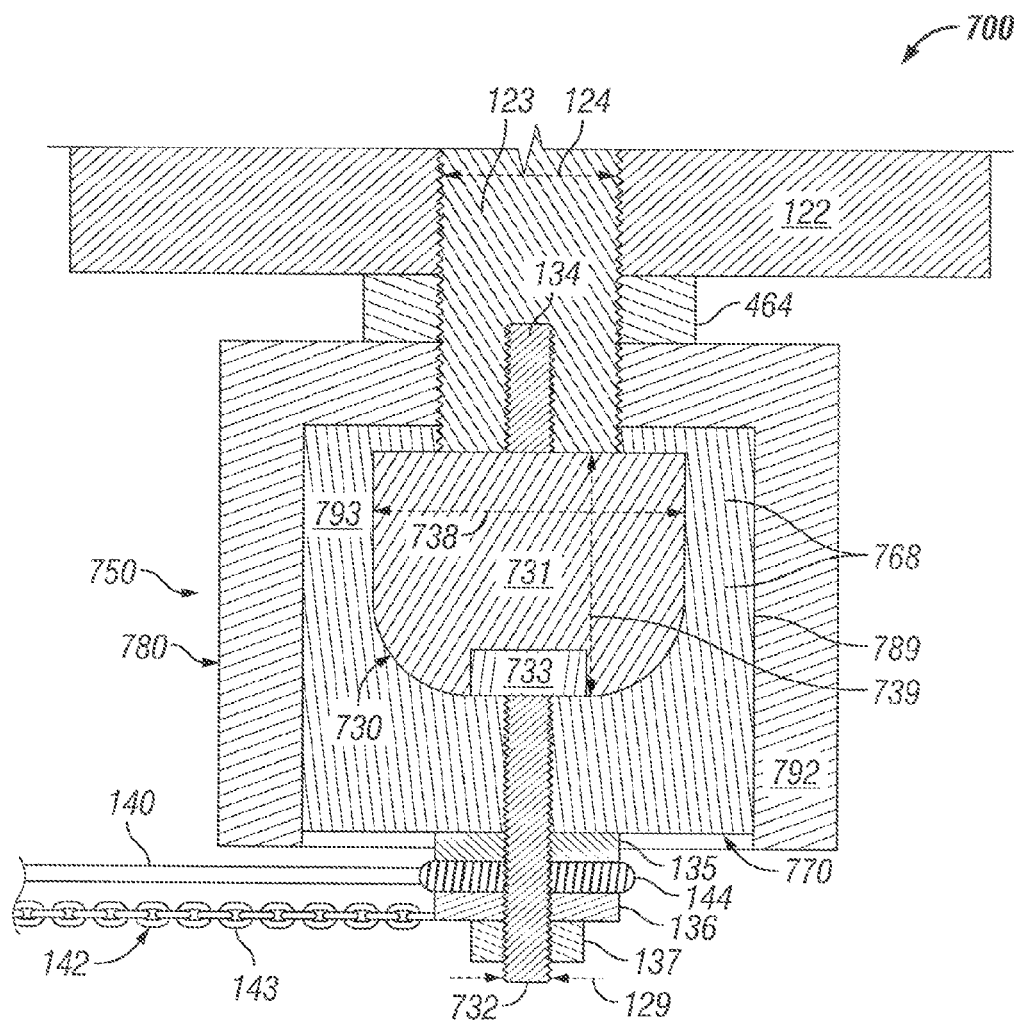
FIG. 7 shows another portion of a transmission system that includes an isolator during normal operating conditions in accordance with certain example embodiments.

FIG. 7 shows yet another portion of a transmission system 700 that includes the isolator 130 of FIGS. 1 and 2 and an isolator protection device 750 during normal operating conditions in accordance with certain example embodiments. Any reference numbers described below but not shown in FIG. 7 are hereby incorporated based on the reference number used in FIGS. 1-6. Further, any description for a component with respect to FIGS. 1-6 can be incorporated into the corresponding component of the system 700 in FIG. 7.

Referring to FIGS. 1-7, the isolator protection device 750 in the system 700 of FIG. 7 differs from the isolator protection device 350 of FIG. 3 in that the securing device 770 is configured differently. Instead of a disc the securing device 770 of the isolator protection device 750 of FIG. 7 includes a potting compound 768 that fills the cavity 793 and surrounds at least a portion of the isolator 730. As used herein, a potting compound 768 is any material (liquid, solid) that can fill at least a portion of the cavity 793 and one or more components (e.g., the isolator body 731, the stud 732) of the isolator 730 stable within the housing 780 of the isolator protection device 750 during normal operating conditions.

The potting compound 768 can be specifically designed to remain solid and within the cavity 793 during normal operating conditions, and yet also break apart or otherwise allow the stud 732 (with or without a portion of the isolator housing 731) to be released during a fault condition when the isolator 730 operates. For example, the potting compound 768 can be designed to break apart or liquefy when its temperature (driven by an explosion of the isolator housing 731) exceeds a certain threshold temperature. As another example, as shown in FIG. 8 below, some or all of the potting compound 768 can be designed to fracture or otherwise break apart when the pressure (driven by an explosion of the isolator housing 731) that it is exposed to exceeds a certain threshold pressure.

In addition, or in the alternative, one or more modifications can be made to the housing 780 of the isolator protection device 750. For example, the inner surface 789 of the side wall 792 can be coated with a special material to allow the potting compound 768 to more easily fall out of the housing 780 when the isolator 730 operates. As another example, the inner surface 789 of the side wall 792 of the housing 780 can be featureless (e.g., smooth) also to allow the potting compound 768 to more easily fall out of the housing 780 when the isolator 730 operates.

Thus, the securing device 770 of the isolator protection device 750 of FIG. 7 is designed to secure, at least in part, the stud 732 to the isolator body 731 during normal operating conditions. Further, the securing device 770 of the isolator protection device 750 of FIG. 7 is designed to release the stud 732 during a fault condition, which allows the stud 732 to become decoupled from the isolator body 731 during the fault condition.

Figure 8:
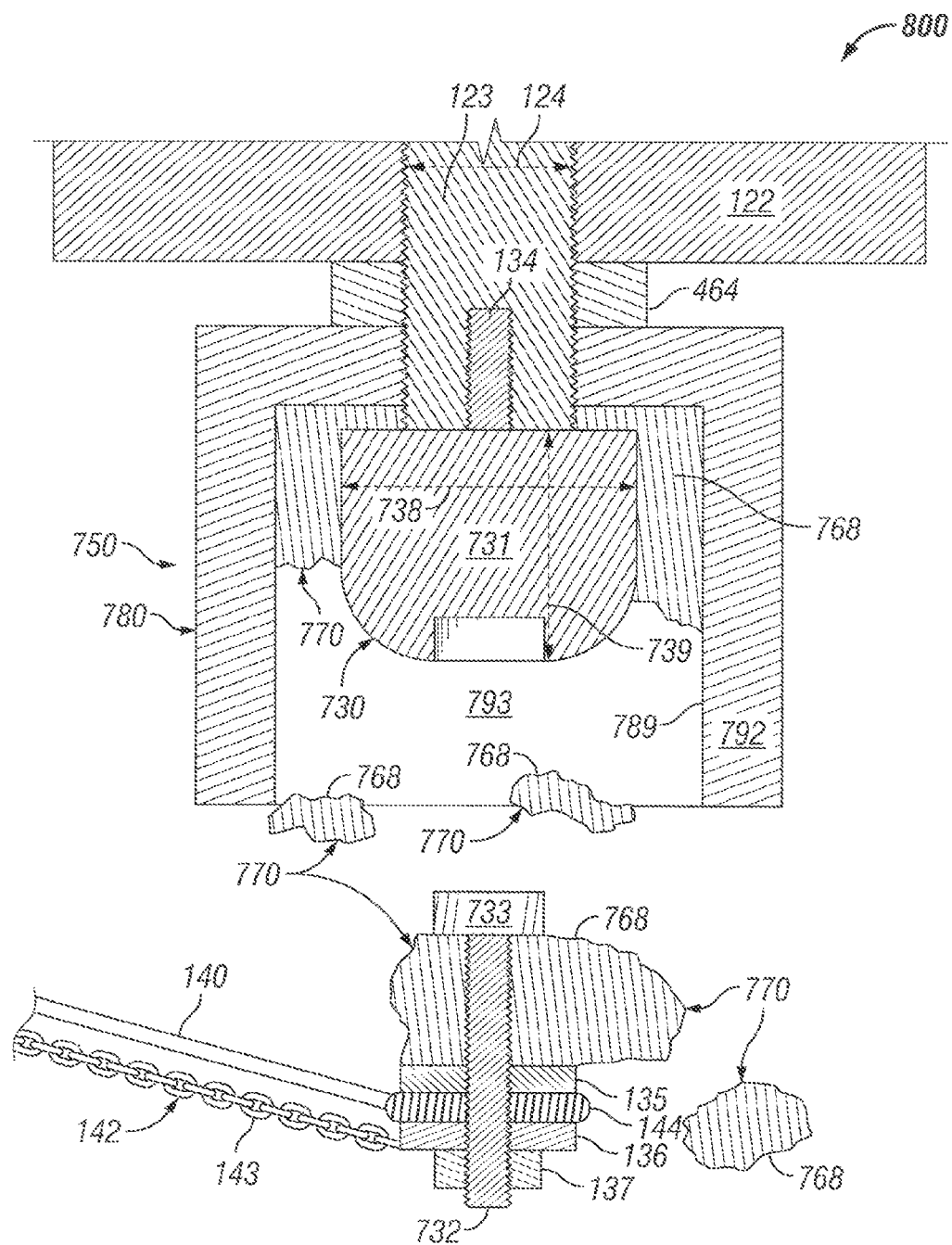
FIG. 8 shows the system of FIG. 7 shortly after a fault condition in accordance with certain example embodiments.

FIG. 8 shows a system 800 that includes the system of FIG. 7 shortly after a fault condition in accordance with certain example embodiments. In other words, the system 800 of FIG. 8 is shown in a fault state. The system 800 of FIG. 8 is substantially the same as the system 700 of FIG. 7, except as described below. Referring to FIGS. 1-8, as a result of the fault condition, the potting compound 768 fractures (especially the potting compound 768 proximate to where the stud 732 couples to the isolator body 731). When the potting compound 768 fractures, as shown in FIG. 8, the stud 732 (as well as the optional head 733) can become physically separated from the isolator body 731. Further, at least a portion of the potting compound 768 (the securing device 770) is physically removed from the cavity 793 and physically separates from the rest of the isolator protection device 750 as a result of the fault condition.

Example embodiments provide increased mechanical stability of the isolator of an arrester, extending the useful life and reliability of the isolator and the arrester as a whole. Example embodiments provide a number of benefits. Examples of such benefits include, but are not limited to reduced downtime of equipment, lower maintenance costs, avoidance of catastrophic failure, improved maintenance panning, improved efficiency of one or more devices and/or other portions of an example transmission system, extended useful life of one or more components of an example transmission system, and reduced cost of labor and materials.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An isolator protection device, comprising:
  a housing comprising at least one wall and a first coupling feature, wherein the at least one wall comprises a top wall portion and at least one side wall portion, wherein the first coupling feature comprises an aperture that traverses the top wall portion, wherein the top wall portion and the at least one side wall portion form a cavity having a bottom end, wherein the first coupling feature is configured to couple to an arrester, wherein the aperture of the first coupling feature is configured to receive an arrester coupling device of the arrester, and wherein the at least one wall is configured to house an isolator body of an isolator within the cavity, wherein the isolator comprises an isolator coupling device that is coupled to the arrester coupling device; and
  a securing device disposed within the cavity toward the bottom end, wherein the securing device is configured to secure a stud of the isolator relative to the isolator body during normal operating conditions, and said stud physically releases when a fault current is detected.

2. The isolator protection device of claim 1, wherein the securing device comprises a potting compound that releases the stud during the fault condition.

3. The isolator protection device of claim 2, wherein the potting compound liquefies as a result of a temperature increase caused by the fault condition.

4. The isolator protection device of claim 2, wherein the potting compound breaks apart as a result of a pressure increase caused by the fault condition.

5. The isolator protection device of claim 2, wherein the at least one side wall portion of the at least one wall comprises an inner surface that is featureless and against which the potting compound is disposed during the normal operating conditions.

6. The isolator protection device of claim 2, wherein the potting compound is a solid during the normal operating conditions.

7. The isolator protection device of claim 1, wherein the securing device has a first width that is less than a second width of the cavity formed by the at least one side wall portion of the at least one wall of the housing.

8. The isolator protection device of claim 7, wherein the securing device comprises a second coupling feature, wherein the second coupling feature is configured to secure the stud during the normal operating conditions.

9. The isolator protection device of claim 7, wherein the securing device comprises a smooth outer perimeter.

10. The isolator protection device of claim 9, wherein the smooth outer perimeter is configured to abut against an inner surface of the at least one side wall portion of the at least one wall of the housing.

11. The isolator protection device of claim 7, wherein the housing further comprises a third coupling feature disposed on an inner surface of the at least one side wall portion of the at least one wall of the housing, wherein the third coupling feature couples to a fourth coupling feature disposed on an outer perimeter of the securing device.

12. The isolator protection device of claim 1, wherein the stud and at least a portion of the securing device are expelled from the cavity during the fault condition.

13. The isolator protection device of claim 1, wherein the at least one wall of the housing lacks a bottom wall portion at the bottom end of the cavity.

14. The isolator protection device of claim 1, wherein the first coupling feature comprises mating threads that couple to complementary mating threads disposed on an outer surface of the arrester coupling device of the arrester.

15. An electrical transmission system, comprising:
    an arrester comprising:
        an isolator comprising an isolator body, an isolator coupling device, and a stud coupled to a distal end of the isolator body; and
    an isolator protection device coupled to the arrester, wherein the isolator protection device comprises:
        a housing comprising at least one wall and a first coupling feature, wherein the at least one wall comprises a top wall portion and at least one side wall portion, wherein the first coupling feature comprises an aperture that traverses the top wall portion, wherein the top wall portion and the at least one side wall portion form a cavity having a bottom end, wherein the first coupling feature couples to the arrester, wherein the aperture of the first coupling feature is configured to receive an arrester coupling device of the arrester, and wherein the isolator body and at least a portion of the stud is disposed within the cavity during normal operating conditions, wherein the isolator coupling device is coupled to the arrester coupling device; and
        a securing device disposed within the cavity toward the bottom end, wherein the securing device couples to the stud of the isolator and helps maintain a coupling between the stud and the isolator body during normal operating conditions, and said stud physically releases when a fault current is detected.

16. The electrical transmission system of claim 15, wherein the arrester further comprises:
    an arrester body comprising a bottom end and a top end, wherein the top end of the arrester body is coupled to a high-voltage conductor, and wherein the bottom end of the arrester body is coupled to the arrester coupling device.

17. The electrical transmission system of claim 15, wherein the cavity formed by the at least one wall of the housing includes an air gap disposed between the at least one side wall portion of the at least one wall and the isolator body.

18. The electrical transmission system of claim 15, wherein the securing device comprises a potting compound that is in a solid form during the normal operating conditions.

19. The electrical transmission system of claim 15, further comprising:
    a ground conductor coupled to a distal portion of the stud, wherein the ground conductor and the distal portion of the stud are disposed outside the cavity during the normal operating conditions.

20. The electrical transmission system of claim 19, further comprising:
    a tether coupled to the distal portion of the stud, wherein the tether is disposed outside the cavity during the normal operating conditions.

* * * * *